3,501,259
PROCESS FOR SIMULTANEOUS COLORATION AND FINISHING OF CELLULOSE FIBERS AND REACTIVE DYES THEREFOR
Robert S. Long, Bound Brook, N.J., assignor to American Cyanamid Company, New York, N.Y., a corporation of Maine
No Drawing. Continuation-in-part of application Ser. No. 769,995, Oct. 28, 1958. This application Apr. 11, 1961, Ser. No. 102,100
Int. Cl. D06p 3/66
U.S. Cl. 8—18
26 Claims

ABSTRACT OF THE DISCLOSURE

Process for simultaneous coloring and finishing of cellulose fibers and other active hydrogen containing substrates from an aqueous solution containing a resin forming substance, an acid catalyst and a fiber reactive dyestuff.

Fiber-reactive dyes for cellulose and other substrates containing active hydrogen have the formula $$D(-X-B-)_n(-CH_2OZ)_n$$

wherein:
D is the chromophoric aromatic residue of a member selected from the group consisting of azo dyes, anthraquinone dyes, phthalocyanine dyes, anthrone dyes, indigoid dyes, xanthene dyes, triarylmethane dyes, diarylmethane dyes, nitro dyes, nitroso dyes, oxazine dyes, thiazine dyes, azine dyes and acridine dyes with $n$ free valences;
X is a divalent bridging group, joining the aromatic moiety of C with B, selected from the group consisting of a covalent bond, $-NR''-$, $-NAcyl-$, $-O-$, $-S-$, $-(CH_2)_m-$, $-(CH_2)_mNR''-$, $-CO-$, $-SO_2-$, $-CONR''-$ and $-SO_2NR''-$
wherein $R''$ is a member selected from the group consisting of hydrogen and lower alkyl and $m$ is a positive integer;
B is a dehydro radical of a group with an active hydrogen, said group being selected from carbamyl, carbamoylalkyl, carbamoylaryl, ureido, cyclized ureido, imido, sulfamoyl, aminotriazinyl and ortho-unsubstituted hydroxyphenyl, the radical $(CH_2OZ)$ being attached to B at the position of the active hydrogen;
Z is a member selected from the group consisting of hydrogen and lower alkyl; and
$n$ is a positive integer less than seven.

This application is a continuation-in-part of application Serial No. 769,995, filed October 28, 1958, now abandoned.

This invention generally relates to compounds which are reactive dyes for polymeric substrates having reactive hydrogen atoms as hereinafter described.

More particularly, this invention relates to dyes containing at least one reactive methylol or alkoxymethyl group represented by the general formula $$A(CH_2OZ)_n \qquad (I)$$

wherein A is a colored organic moiety described hereinafter; Z is hydrogen or a lower alkyl group i.e., an alkyl of from one to seven carbons, and $n$ is a positive integer less than 7. This invention further relates to formulations of such reactive dyes with conventional dyeing assistants and textile finishing agents, to the application of said dyes to polymeric substrates such as fibers, plastics, spinning masses, resins and the like, especially to those substrates having reactive hydrogen atoms, and to the polymeric substrates colored with said dyes.

Water-soluble dyes have been previously known. In the prior art, the ones most frequently used to color textiles were those which became attached by physical forces, such as adsorption. These include the direct dyes for cotton and rayon, and the acid dyes for wool and nylon. Such dyes, however, were not satisfactory because of their very poor fastness to wet treatments and their tendency to migrate and bleed.

In an effort to solve this problem, it was attempted to dye fibers with a dye which would react with the fiber to give a colored substrate in which the coloring moiety was chemically bonded to the fiber and thus stable against leaching by wet treatment. Known dyes of this type suffered certain disadvantages which made them unsatisfactory. They had to be applied in the presence of strongly basic catalysts with which they were not always stable. They tended to undergo hydrolysis in the dye bath, leading to an incomplete color yield of dye actually bonded to the fiber. Moreover, under optimum conditions of fixation, these dyes could not be applied simultaneously with the variety of resins normally used to impart wrinkle recovery to cellulosic fibers, since the conditions required for each treatment were different.

In view of this lack of success with water-soluble dyes, when in the past it had been desired to obtain high wash fastness together with high color yield, insoluble dyes had to be employed. They were applied as such or as precipitates within the fiber. Such dyes include: the resin-bonded pigments; the azoic dyes; the vat dyes; the direct dyes after-treated with a metal or a cationic agent; and leuco vat esters. In the case of both insoluble and soluble dyes, treatment with textile improving agents had to be a separate and subsequent operation.

It is generally an object of the present invention to provide a new class of compounds which color materials to which they are applied. It is a particular object of the present invention to provide a class of water-soluble dyes which will react with substrates having a replaceable hydrogen, thereby forming a dyed substrate having a chemically bound dyestuff moiety.

It is another object of this invention to provide colored polymeric materials which are fast to wet conditions, in which the dye does not tend to bleed or migrate, and which, in the case of cellulosic textile substrates, can be prepared by a dyeing treatment conducted concurrently with desired textile finishing treatments.

It is still another object of the present invention to provide processes by which the foregoing materials can be prepared.

Other objetcs will become hereinafter apparent.

It has been found that dyes containing one or more $-CH_2OZ$ groups, wherein "Z" is as hereinbefore defined, each in the place of a reactive hydrogen on the dye molecule, substantially avoid the difficulties encountered with prior art dyestuffs.

Thus, even when they are water soluble, they are capable of producing dyed polymeric materials of superior wet fastness and intense coloration, especially when applied, by the process hereinafter described, to polymeric materials having reactive hydrogen atoms. Moreover, they may be applied to cellulosic textiles simultaneously with textile finishing agents to impart both color and wrinkle recovery in one step.

The dyestuffs of the present invention differ from known dyestuffs in the respect that one to seven active hydrogens of the latter are replaced with from one to seven $-CH_2OZ$ radicals, wherein Z is hydrogen or a lower alkyl group of from one to seven carbon atoms (e.g., methyl, ethyl, propyl, isopropyl, n-butyl, t-butyl, isobutyl, amyl, hexyl and heptyl). When properly applied to cellulosic fibers or other fibers having reactive hydrogens, they show an exceptionally high color yield, and therefore require little washdown for removal of unattached dye. Under the same conditions they may be applied either alone or simultaneously with textile improving agents to impart both color and wrinkle recovery in one step. These dyes may be used on a variety of fiber and resin substrates, to be described, and show similar resistance to wet treatments on all those substrates, especially those having reactive hydrogens.

The various aspects of the present invention will be hereinafter described in more detail under the appropriate headings.

DYESTUFFS

The dyestuffs of this invention, having the formula $$A(CH_2OZ)_n \qquad (I)$$

may be derived from any class of organic dyes such as azo, anthraquinone, phthalocyanine, anthrone (e.g., anthrapyridones and anthrapyrimidones), indigoid, xanthene, triarylmethane, diarylmethane, nitro, nitroso, azine, acridine, thiazine and oxazine dyes and the like.

The radical "A," furthermore, is derived from a colored compound $AH_n$, in which the designated hydrogen atoms are reactive by reason of their particular situation in the molecule. Such a reactive hydrogen atom may be situated on a nitrogen, oxygen or sulfur atom of the compound $AH_n$, or on an activated aromatic or activated aliphatic carbon atom of that compound. More specifically, the reactive hydrogens may be those of a non-basic primary amino group ($-NH_2$), a secondary amino group ($-NHR$, wherein R is aryl, alkyl, aralkyl, or part of a cycle), an imino group ($=NH$), a hydroxy group ($-OH$), a mercapto group ($-SH$), or a part of an aromatic ring activated by a hydroxy substituent, or on an aliphatic carbon atom activated by electron-withdrawing substituents.

The group $-CH_2OZ$ may be hydroxymethyl (i.e. methyl, $-CH_2OH$), methoxymethyl ($-CH_2OCH_3$), n-butoxymethyl ($-CH_2OC_4H_9$) or another lower alkoxymethyl group. In the preferred cases, the dyes also contain solubilizing groups. These may be either nonionizing or ionizing groups. If nonionizing, such groups may be hydrophilic residues such as hydroxyalkyl (including the methylol groups themselves), polyhydroxyalkyl, carbamoyl, sulfamoyl, alkylsulfonyl, phosphonamoyl, arsinamoyl, sulfinamoyl, sulfenamoyl and the like. If ionizing, such solubilizing groups may be sulfonic, carboxylic, phosphonic and the like, in free acid form or in the form of an alkali metal (e.g., sodium and potassium) or ammonium salt. Or the ionizing groups may be quaternary ammonium or phosphonium, or ternary sulfonium groups, in the form of salts with chloride, iodide, methosulfate, tosylate, or other anions.

For the purpose of further illustrating the dyestuffs of this invention, the compound "$AH_n$" may be drawn as follows:

$$D(-X-B)_n \qquad (II)$$

wherein D is an aromatic chromophoric organic moiety; $n$ is as hereinbefore defined; X is a divalent bridging group joining the aromatic moiety of D to B; and B is a group which contains an active hydrogen. In the preferred cases, D, X or B, or all, contain one or more solubilizing groups as defined herein.

Since the final dyestuffs of this invention may be derived from known or readily obtainable aromatic organic dye molecules, the radical D can be the colored moiety of any dyestuff such as azo, anthraquinone (and other vats), phthalocyanine, anthrone (e.g., anthrapyridone and anthrapyrimidone), indigoid, xanthene, triarylmethane, diarylmethane, nitro, nitroso, azine, aridine, thiazine, and oxazine dyes, and the like. Because the preferred dyes of the present invention are compounds wherein D is the colored radical derived from an azo, an anthraquinone, an anthrapyridone or a phthalocyanine dye, these will be outlined in more detail.

AZO DYE RESIDUES

The azo dye residues for the new dyestuffs of this invention are derived from various aromatic diazo components and coupling components. Examples of the amines which may be used to form the diazo components are:

aniline,
o-nitroaniline,
m-nitroaniline,
p-nitroaniline,
o, m, and p-chloroaniline,
2-nitro-4-chloroaniline,
2-amino-5-nitrotoluene,
4-amino-3-nitrotoluene,
2-amino-4-nitrotoluene,
2-amino-5-chlorotoluene,
2-amino-4-chlorotoluene,
2-amino-6-chlorotoluene,
2,5-dichloroaniline,
3,4-dichloroaniline,
3-amino-4-chlorotoluene,
o, m, p-anisidine,
3-nitro-4-methoxyaniline,
4-nitro-2-methoxyaniline,
2-nitro-4-ethoxyaniline,
dianisidine,
1-amino-2,5-diethoxy-4-benzoylaminobenzene,
4-amino-1-benzoylamino-2,5-dimethoxybenzene,
benzidine (including monoacyl derivatives),
tolidine,
4-chloro-2-methoxyaniline,
1,5-dimethoxy-2-amino-4-chlorobenzene,
1-methoxy-2-benzoylamino-4-chloro-5-aminobenzene,
1-naphthylamine,
1-aminoanthraquinone,
1-amino-3-chloroanthraquinone,
3-amino-4-methoxybenzenesulfondiethylamide,
4-methoxy-2-aminophenylethylsulfone,
4-benzoylamino-6-amino-m-xylidine,
4-methoxy-4'-aminodiphenylamine,
4-aminodiphenylamine,
4-chloro-2-aminodiphenyl ether,
4,4'-dichloro-2-aminodiphenyl ether,
o-aminodiphenylamine,
2,6,4'-trimethyl-3'-nitro-4-aminoazobenzene,
5-methyl-4-methoxy-2-amino-2'-chloro-4'-nitroazobenzene,
4-phenylazo-1-naphthylamine,
m and p-aminoacetanilide,
N-benzoyl-m and p-phenylenediamine,
sulfanilamide,
metanilamide,
orthanilamide,
m and p-amino-N-methylacetanilide,
o, m and p-aminobenzamide,
4 and 5-aminosalicylamide,
2-amino-1-phenol-4-sulfonic acid,
6-amino-4-nitro-1-phenol-2-sulfonic acid,
2-amino-1-phenol-5-sulfonamide,
2-amino-2'-methyldiphenylether-4-sulfonic acid,
4-aminoazobenzene,
4-aminoazobenzene-4'-sulfonic acid,
4-aminoazobenzene-3,4'-disulfonic acid,
orthanilic acid,
metanilic acid,
sulfanilic acid,
6-methylmetanilic acid,
2-amino-5-chloro-4-methylbenzene sulfonic acid,
5-chloroorthanilic acid,
aniline-2,5-disulfonic acid, 4-chloro-5-methylorthanilic acid,
4-methoxyorthanilic acid,
2,4-dimethylaniline-6-sulfonic acid,
3-amino-1-trifluoromethylbenzene-4-sulfonic acid,
3,4-dichloroaniline-6-sulfonic acid,
3,5-dichloroaniline-6-sulfonic acid,
3-methoxyaniline-6-sulfonic acid,
4-methylaniline-2-sulfonic acid,
dehydrothiotoluidinesulfonic acid,
2-aminonaphthalene-4,8-disulfonic acid,
2-aminonaphthalene-6-sulfonic acid,
2-aminonaphthalene-6,8-disulfonic acid,
2-amino-1-naphthol-4-sulfonic acid,
1-aminonaphthalene-4-, 5-, 6- and 8-sulfonic acids,
2-aminonaphthalene-5,7-disulfonic acid,
2-aminonaphthalene-7-sulfonic acid,
2-aminonaphthalene-1-sulfonic acid,
p-phenylenediamine,
2-aminonaphthalene-1,5-disulfonic acid,
3,3'-dichlorobenzidine,
3'-benzidine-3,3'-disulfonic acid,
2,2'-dichloro-3,3'-dimethoxy-4,4'-diaminodiphenyl,
4-aminopyridine,
3-aminopyridine,
2-aminobenzothiazole,
4-aminoquinoline.

Examples of the compounds which may be used as the coupling components are:

aniline,
o-toluidine,
m-toluidine,
2,5-dimethylaniline,
o-anisidine,
m-anisidine,
2-methoxy-5-methylaniline,
2,5-dimethoxyaniline,
N-methylaniline,
N-methyl-o-toluidine,
N-methyl-m-toluidine,
N-ethyl-o-toluidine,
N-methyl-2-methoxy-5-methylaniline,
N-ethyl-2-methoxy-5-methylaniline,
N-methyl-m-anisidine,
1-amino-8-naphthol-6-sulfonic acid,
1-amino-8-naphthol-3,6-disulfonic acid,
1-amino-8-naphthol-4,6-disulfonic acid,
1-methylamino-8-naphthol-6-sulfonic acid,
2-amino-5-naphthol-7-sulfonic acid,
2-methylamino-5-naphthol-7-sulfonic acid,
1-amino-8-naphthol-2,4-disulfonic acid,
1-amino-8-naphthol-4-sulfonic acid,
1-amino-8-naphthol-6-sulfonic acid,
3-methyl-5-pyrazolone,
1-phenyl-3-methyl-5-pyrazolone,
1-(4-sulfophenyl)-3-methyl-5-pyrazolone,
1-(4-chlorophenyl)-3-methyl-5-pyrazolone,
1-phenyl-3-carbethoxy-5-pyrazolone,
acetoacetanilide,
4'-sulfo-acetoacetanilide,
bis-acetoacetbenzidide,
acetonacettoluidide,
acetoacettoluidide,
m- and p-aminoacetanilide,
m- and p-amino-N-methylacetanilide,
1-naphthol-6-sulfonic acid,
3-hydroxy-2-naphthamide,
3-carbamoyl-2-naphthol-1,6-disulfonic acid,
N-[2-aminoethyl]-N-ethyl-m-toluidine,
beta hydroxynaphthoic acid, arylides of various naphthoic acids such as 2-hydroxynaphthanilide, 2-hydroxynaphthoyltoluidide and the like. Many other coupling components and diazo components are known and can be used. For obtaining the preferred azo dye residues, the coupling and/or the diazo component should have a solubilizing group.

A particularly preferred class of azo dye residues are monoazos having from one to three sulfonic acid groups.

VAT DYE RESIDUES

The various anthraquinone and other polyquinoid structures which are known collectively under the generic term of "vat dyes," are useful herein. Vat dye moieties with solubilizing groups, e.g., free sulfonic or carboxylic acid substituents, are preferred.

Examples of the anthraquinone (AQ) compounds which may be used to form the dyestuffs of this invention are:

1-amino-4-(4'-aminophenylamino)-AQ-2,3'-disulfonic acid,
1-methylamino-4-(4'-aminophenylamino)-AQ-2,3'-disulfonic acid,
1-amino-4-(4'-aminophenylamino)-AQ-6,3'-disulfonic acid,
1-amino-4-(4'-aminophenylamino)-AQ-2,3',5'-trisulfonic acid,
1-methylamino-4-(4'-aminophenylamino)-AQ-6-sulfonic acid,
1-methylamino-4-(4'-aminophenylamino)-AQ-6,3'-disulfonic acid,
1-cyclohexylamino-4-(4'-aminophenylamino)-6-sulfonic acid,
1-methylamino-4-(3'-aminophenylamino)-AQ-6-sulfonic acid,
1-amino-4-(3'-aminophenylamino)-AQ-2,4'-disulfonic acid,
1-amino-4-(4'[4''-aminophenylazo]-anilino)-AQ-2,5,2''-trisulfonic acid,
1-amino-4-(4'-[4''-aminophenyl]-anilino)-AQ-2,5,3''-trisulfonic acid,
1-amino-4-(4'-aminophenylamino)-AQ-3'-sulfonic acid,
1-amino-4-(3'-aminophenylamino)-AQ-4'-sulfonic acid,
1-amino-4-(4'-aminophenylamino)-AQ-2-sulfonic acid,
1-amino-4-(3'-amino-4'-methylphenylamino)-AQ-2-sulfonic acid,
1-amino-4-(4'-amino-3'-methylphenylamino)-AQ-2-sulfonic acid,
1-amino-4-(3'-amino-4',6'-dimethylphenylamino)-AQ-2-sulfonic acid,
1-amino-4-(4'-aminophenylamino)-AQ-3'-sulfonic acid diethylamide.

Of these a preferred class may be represented by the formula:

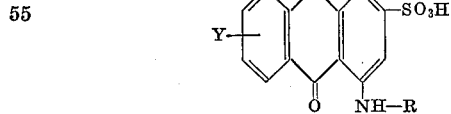

wherein Y is hydrogen or sulfonic acid; and R represents an aryl radical which may be further substituted, especially with solubilizing groups such as sulfonic acid or carboxylic acid.

ANTHRONE RESIDUES

The anthrone class of dyestuffs is derived from the anthraquinone class by cyclization in the 1,9-position. These dyes form a highly specialized class in themselves noted for their shade range of orange to red and their generally good light fastness. Many substituted anthrone dyes may be used as starting materials in this invention. These may be, for example, the following: pyrazolanthrones, such as 3,3'-disulfo-5-(4'-aminoanilino) pyrazolanthrone, and 2-methyl-4',8-disulfo-5(3'-aminoanilino) pyrazolanthrone; anthrapyrimidines, such as 4,3'-disulfo-6(4'-aminoanilino) anthrapyrimidines; anthrapyrimidones, such as 3-methyl-4,4'-disulfo-6(3'-aminoanilino)-anthrapyrimidone and 3-ethyl-8,3'-disulfo-6(4'-aminoanilino) anthrapyrimidone; and anthrapyridazones, such as 2(4'-sulfophenyl)-6(4"-sulfo-3"-aminoanilino) anthrapyridazones.

A preferred class of anthrone dyes are the anthrapyridones, which are bright red dyes fast to light. This preferred class may be designated by the formula

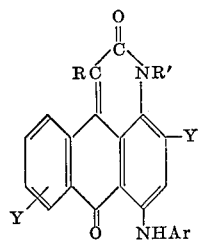

wherein Y is hydrogen or sulfonic acid, R is alkyl, aryl or acyl, R' is hydrogen or alkyl, and Ar represents an aryl radical which may be further substituted, especially with solubilizing groups such as sulfo or carboxy groups.

PHTHALOCYANINE RESIDUES

The phthalocyanine moiety is a highly stable and highly colored chemical structure. Various amino substituted phthalocyanines, including many which are sulfonated or carboxylated or otherwise substituted by an acid grouping can be used herein. Amino groups may be directly on the phthalocyanine rings or they may be in a side chain such as an aminomethyl group. Such products can be prepared from phthalocyanine itself by treatment with methylolphthalimide and sulfuric acid as described in the U.S. Patent 2,761,868.

Sulfonation can occur at the same time under the proper conditions and up to four aminomethyl groups can readily be introduced as well as up to four sulfonic acid groups. Also phthalocyanine carboxylic acids can be aminomethylated in the same manner. Similarly, the nuclear substituted phthalocyanines, such as those containing one to four chlorines, can be sulfonated and aminomethylated. The total number of substituents on one phthalocyanine molecule should not exceed nine. The phthalocyanines are used either as metal-free phthalocyanines or in the form of their copper, cobalt, nickel or other metal complexes. The copper phthalocyanine residues containing two or three sulfo groups are preferred.

THE DIVALENT BRIDGING GROUP

The radical X in Formula II is a divalent bridging group joining the aromatic moiety of D to B. Examples of bridging groups which are useful herein are: a covalent bond, —NR"—, —NAc—, —O—, —S—, —(CH$_2$)$_m$—, —(CH$_2$)$_m$NR"—, —CO—, —SO$_2$—, —CONR"— and —SO$_2$NR"—, wherein R" is hydrogen or lower alkyl; Ac is an acyl radical derived from an organic acid. and $m$ is a positive integer, usually less than eight.

THE RADICAL "B"

The radical B is a dehydro radical of a monovalent group which contains an active hydrogen, i.e., at least one active hydrogen of said group is replaced by a CH$_2$OZ group. Such groups, attached through X to the aromatic moiety of D, are well known and are exemplified by the following illustrative outline, wherein R", X, Ac and D are as hereinbefore defined. Asterisks indicate active hydrogen which if replaced by CH$_2$OZ groups give the dyes of this invention.

1. Carboxamide

DCH$_2$CONH$_2$*

DNHCH$_2$CONH$_2$*

D—N(COCH$_3$)—CH$_2$CONH$_2$*

DOCH$_2$CONH̊CH$_3$

DCH$_2$CH$_2$CONH̊C$_3$H$_7$

DCH$_2$NHCH$_2$CONH$_2$*

DSO$_2$CH$_2$CONH̊C$_2$H$_5$

DSO$_2$NH̊CH$_2$CONH$_2$*

DNHCOCH$_2$CH$_2$CONH$_2$*

DCH=CHCONH̊R"

DNR"COCH=CHCONH̊R"

DNR"COCONH̊R"

DCONH̊R"

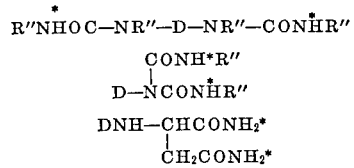

R"NHOC—NR"—D—NR"—CONH̊R"

CONH*R"
   |
   D—NCONH̊R"

DNH—CHCONH$_2$*
   |
   CH$_2$CONH$_2$*

2. Thiocarboxamido

D—X—CSNH̊R"

3. Amidino

D—X—C(=NR")NH$_2$*

4. Ureido

D—X—NR"—CO—NH̊R"

e.g. DCH$_2$NHCONH$_2$*

DNHCONH$_2$*

5. Thioureido

DXNHCSNH$_2$*

6. Guanidino

DXNHC(=NH̊)NH$_2$* e.g. DCH$_2$NHC(=NH̊)NH$_2$*

DSO$_2$NHC(=NH̊)NH$_2$*

DCONHC(=NH̊)NH$_2$*

7. Biuret

DXNHCONHCONH$_2$*

8. Biguanido

DXHNC(=NH̊)NHC(=NH̊)NH$_2$*

9. Imidazolid-one, -thione, and -imine

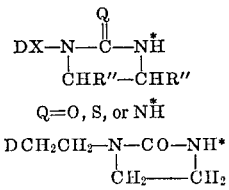

Q=O, S, or NH̊ e.g. DCH$_2$CH$_2$—N—CO—NH*
              |          |
              CH$_2$——CH$_2$ 3,501,259
10. 4,5-dihydroxyimidazolidone, thione, and imine
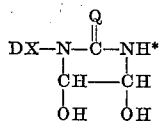
11. Tetrahydropyrimidone and pyrimidinethione
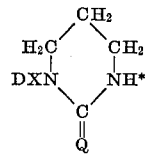
12. Triazinone and triazinethione
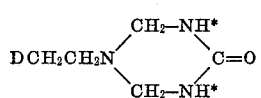
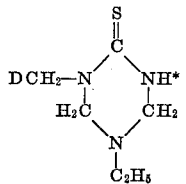
13. Uron
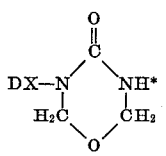
14. Acetylenediurea
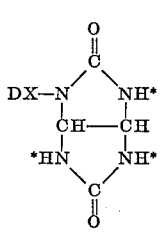
15. Imido
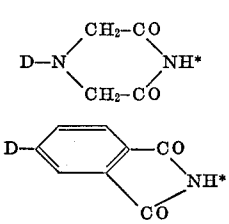
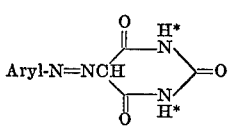
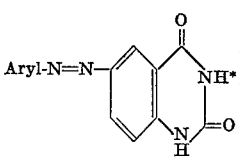
16. Sulfonamido
DSO₂NHR″
17. Hydrazido
DCONH*—NH*—CO—D
18. Aminotriazine
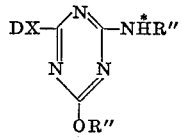
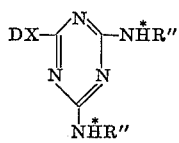
e.g. 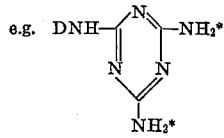
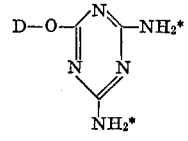
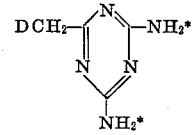
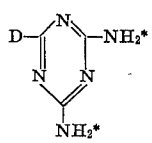
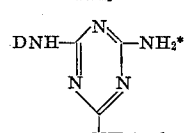
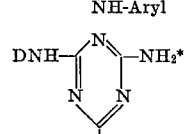
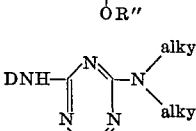
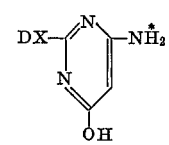
19. Aminopyrimidine
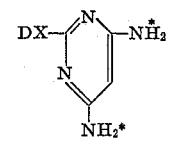
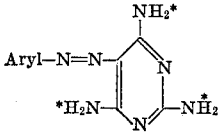

20. Aminoquinazoline

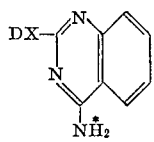

21. Alcohol

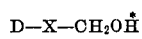

22. Mercaptan

D–X—CH² SH*

23. Compound with an activated aromatic ring

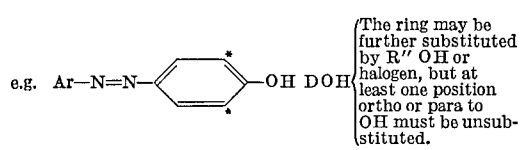

e.g. Ar—N=N—⟨ ⟩—OH  D OH (The ring may be further substituted by R″ OH or halogen, but at least one position ortho or para to OH must be unsubstituted.)

24. Compound with an activated aliphatic carbon atom

D—X—CHY′Y″

Y′ and Y″=electron-withdrawing groups such as —COR, —CO₂R, —CONRR′, CN, SO₂R

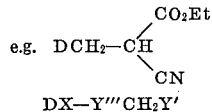

e.g. DCH₂—CH(CO₂Et)(CN)

DX—Y‴CH₂Y′

Y‴=divalent electron-withdrawing groups, —CO— or —SO₂— e.g. DNHCOCH₂COCH₃

Preferred "B" radicals are those represented under items 1, 16, 18 and 23 of the foregoing.

PREPARATION OF DYESTUFFS

The compounds of this invention may be prepared in a number of alternative ways:

(A) The dyestuff $AH_n$, as defined above, i.e., a dyestuff intermediate molecule having at least one reactive hydrogen, may be reacted with formaldehyde or a formaldehyde generating substance, e.g., paraformaldehyde (hereinafter referred to as "a formaldehyde"), in a weakly acid to strongly alkaline aqueous medium i.e., pH of about 4 to about 11, at ambient temperature, i.e., about 15°–30° C., or with gentle warming, to give methylolated derivatives. Usually an excess of a formaldehyde is employed, but where only one methylolated group is desired a limited amount of a formaldehyde is used.

When the starting material is $AH_n$, this procedure forms the methylol compounds of this invention. Where the starting material is a dye component, e.g., a diazo or a coupling component for azo dyes, the dye synthesis is completed by the appropriate coupling process, i.e., by combination with a suitable diazo or coupling component.

(B) The methylol groups may also be introduced into the dye molecule or dye intermediate by indirect methods, such as the hydrolysis of a chloromethyl or aminomethyl group under acidic or basic conditions at elevated temperatures (e.g., about 40° to 100° C.). Suitable acidic or basic materials are the conventional aqueous mineral acids or alkalies such as dilute or concentrated hydrochloric acid, caustic soda, soda ash and the like.

(C) A polymethylol compound may be reacted with a dye molecule which contains a primary or secondary amino group i.e., (—NHR″ wherein R″ is as hereinbefore defined). When equimolar amounts of the two components are used, one methylol group of the polymethylol compound reacts with the amino group of the starting dye, leaving the remaining methylol groups unchanged in the final dye. Examples of polymethylol compounds which may be useful in this type of synthesis are:

dimethylolurea
dimethylol-N-ethyltriazinone
dimethylol ethyleneurea
1,3-dimethylol-4,5-dihydroxy-imidazolidone
trimethylolmelamine
tetramethylolacetylenediurea
hexamethylolmelamine
2,4,6-trimethylolphenol and other methylol-containing crosslinking agents (D) The alkoxymethyl dyes (Z=lower alkyl) may be prepared by the direct alkylation of the corresponding hydroxymethyl (methylol) dyes. Alkylation of the methylol group is effected by reaction with alcohols, especially the lower alkanols such as methanol or butanol in a mineral acid medium, i.e., HCl, $H_2SO_4$, HBr, etc., for a short time at room temperature, i.e., about 15–30° C.

(E) Alkylated methylol compounds of this invention may also be prepared by the direct route of reacting compounds of the formula $AH_n$ with chloromethylmethyl ether in an anhydrous medium such as dimethylformamide in the presence of a basic catalyst such as sodium bicarbonate.

(F) The alkoxymethyl dyes may also be prepared, as in procedure C, by the reaction of a polyalkoxymethyl compound with an amino-containing dye, or with $AH_n$, in such proportions that an excess of alkoxymethyl groups is furnished over amino groups, or over reactive hydrogens of $AH_n$. Examples of polyalkoxymethyl compounds which may be used are:

bis-methoxymethylurea
bis-methoxymethyluron
tris-methoxymethylmelamine
tris-butoxymethylmelamine In the reaction with a formaldehyde or with a polymethylol compound, the final product can be a mixture of mono-, di- and poly- methylolated derivatives except where only one reactive hydrogen has been present as in "A—H." Where more than one reactive hydrogen is present, the product of methylolation may be a mixture of compounds containing one or more $CH_2OH$ and/or $CH_2OZ$ groups up to the total of reactive hydrogen atoms present.

APPLICATION OF THE DYES

The dyes of this invention may be applied to various types of fibers, spinning masses and resins. They are of especial use when applied to fibers having free hydroxy, amino or mercapto groups such as cellulosic fibers in natural or regenerated forms, e.g., cotton, viscose rayon, acetate rayon, cuprammonium rayon, cyanoethylated cellulose, and the like, or non-cellulosic fibers such as nylon, wool, silk, reduced wool and the like. They may also be applied to the spinning masses of the above fibers where these are known, as in the case of cellulose acetate and nylon. They may also be applied to resin masses having free hydroxyl or amino groups, such as cellulose ester, polyamide, polyether urethane, polyvinyl alcohol resins and the like. In the case of the substrates so far mentioned, all of which contain reactive hydrogen atoms, it is likely that a discrete chemical reaction takes place between one or more of the $CH_2OZ$ groups of the dye and the reactive hydrogens of the substrate with elimination of ZOH and formation of a covalent bond between dye and substrate.

A further application of the dyes of this invention is in the coloration of thremosetting resins which in themselves contain $CH_2OZ$ groups, such as the urea-formaldhyde, melamine-formaldehyde and phenol-formaldehyde polymers. Such resins commonly find use in the fabrication of plastics, in the matrix of non-woven fabrics, and in textile coatings for the bonding of colorants. It is likely that the dyes of this invention react chemically with the $CH_2OZ$ groups of such resins.

By whatever mechanism these dyes are attached to the substrates, the final result is to obtain a stable coloration of the substrate, which, in the case of fibers, is resistant to washing and other wet treatments, and, in the case of resins and plastic, is resistant to bleeding and migration.

The method of applying the dyes of this invention involves a heat curing treatment whereby the dye becomes more firmly affixed to the substrate. Although it is not intended to limit this invention to any theory thereon, it is believed that during the curing period a reaction actually takes place between the —$CH_2OZ$ group of the new dye and the hydroxy group, mercapto group, amino group or $CH_2OZ$ group of the substrate so that chemical bonding takes place.

In applying the new dye to fibers, the dye may be applied by exhaust, padding or printing with an aqueous solution solution or dispersion having from 0.05% to 10% by weight of the dye, containing an acid catalyst. After the dye has been applied, the fabric is dried. It is then necessary to cure the dyestuff by heating, a process which effects condensation of the methylol groups with the fiber and consequently achieves direct chemical bonding of the dyestuff to the fiber. After curing, any excess of dyestuff solution can be removed by giving the fiber a light soaping after-treatment. The temperature, concentration, pH, catalyst, drying time and curing time will depend on the dye and on the fiber.

When the dyes are water-soluble, they are preferably applied from an aqueous solution at ambient temperatures, i.e., about 15–30° C., although temperatures up to 80° C. are feasible. Dyes which are not water-soluble may be padded as aqueous dispersions, using common dispersing agents, or as solutions in organic solvents, such as alcohol, acetone or dimethylformamide. The aqueous solution or dispersion should have a pH of from about 3 to about 9, the lower acid pH being preferred.

The acid catalysts which may be used include zinc nitrate, magnesium chloride, alkanolamine hydrochlorides, aluminum nitrate, ammonium sulfate, phosphoric acid, oxalic acid, zinc fluoborate and the like. The amount of acid catalyst which may be used varies with the catalyst. Thus the metal salt catalysts are used in the range 3% to 30%, based on the weight of the dye, 10–20% being a convenient amount; the alkanolamine salts are used in the range 5–15%; the free acids are used in the range 1–5% on the same weight basis. Drying of the fabric may be accomplished at temperatures ranging from room temperature to about 95° C., though about 35° to about 65° C. is preferable for speed and convenience.

The dry paddings are cured at temperatures ranging from about 130° to about 195° C. for about ½ to about 10 minutes. For any given dye, lower cure temperatures require longer times of cure. The temperature and time of cure for optimum coloration and fastness depend on the nature of the dye used; for example, the location of the methylol group in the dye molecule e.g., whether it is on a carbamoyl group or on an activated aromatic ring, will determine the severity of curing conditions required for maximum fastness. A cure at about 165° to about 195° C. for ½ minute to 3 minutes will give high color yields and durability as a general rule.

After curing, the fabric may be washed, if desired, with solutions containing detergent and/or soda ash for removal of the catalyst and any loosely bound dye, at room temperature or higher. Generally, color yields ranging up to 95% of the applied dye are obtained, depending on the nature of the dye and the application conditions. The wet fastness ratings of the dyed fabric are exceptionally high by standard AATCC tests, such as neutral or alkaline washing at temperatures up to about 70° C., exposure to acid and alkaline perspiration, and wet crocking.

It is a further advantage of this invention, especially as it concerns the coloration of fibers having reactive hydroxyl, amino or mercapto groups such as polyhydroxylated fibers, e.g., cellulosic fibers, that these dyes may be applied simultaneously with the various textile finishing agents normally applied in order to impart wrinkle recovery, dimensional stability or hand modification to the fabric. Among the textile resins which may be so used are the following: urea-formaldehyde resins, such as dimethylolurea; imidazolidone-formaldehyde resins, such as 1,3-dimethylol-2-imidazolidone; dihydroxyimidazolidone resins, such as 4,5-dimethoxy-2-imidazolidone and 1,3-dimethylol-4,5-dihydroxy-2-imidazolidone; pyrimidone-formaldehyde resins, such as 1,3-dimethyloltetrahydro-2-pyrimidone; melamine-formaldehyde resins, such as trimethylolmelamine, N,N'-bis-methoxymethyl-N"-hydroxymethylmelamine, and hexakis-methoxymethylmelamine; guanamine-formaldehyde resins, such as N,N'-dimethylolacetoguanamine; triazinone-formaldehyde resins, such as 1,3-dimethylol-5-ethyl-tetrahydro-2-triazinone; uron-formaldehyde resins as described in U.S. Patents 2,373,136–6; acetylene-diurea-formaldehyde resins; polyamide-formaldehyde resins, such as N,N'-dimethylolsuccinamide; epoxy resins, such as diglycidyl ether; and aziridinyl resins, such as tris-(1-aziridinyl) phosphine oxide.

Both the dye and finishing agents may be applied to the fabric from the same aqueous solution or pad bath and cured together. The effect is to obtain coloration and finishing (e.g., crease resistance) of the fabric in one operation, which may be continuous, with consequent savings of time, labor and equipment.

The amount of textile resin used is the amount conventionally used to impart the various effects, and depends on the effect desired, on the nature of the fiber and resin. For cotton, 1–20% of resin solids is commonly applied, and for rayon, 1–30%, based on the weight of fabric.

Another advantage of this invention is that the dyes can be used in union dyeing of blends of cellulosic fiber with hydrophobic fiber such as terephthalic polyesters. The dyes are fully compatible with the disperse dyes and dyeing assistance normally used to color such hydrophobic fibers, and the application conditions for both classes of dye are mutually compatible.

A further advantage of the dyes of this invention is that the same range can be used to dye a variety of fibers, namely, cellulosics of all kinds, nylon, silk, wool, etc.

The following examples are presented to illustrate the present invention more fully. Parts and degrees, unless otherwise noted, are in terms of weight and centigrade, respectively.

EXAMPLE 1

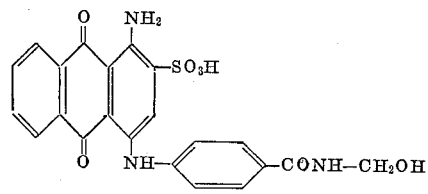

(A) A mixture of 48.3 parts of bromamine acid (as Na salt), 30 parts of p-aminobenzamide, 50 parts of sodium bicarbonate, 2 parts of cuprous chloride as catalyst and 500 parts of water is stirred and heated for 3½ hours at 72–75° C. The product is diluted to 1500 parts by volume with water, and the dye which is precipitated with 150 parts of salt, is filtered and washed with 3% brine until the washings become color free. The wet filter cake is redissolved in 1500 parts of water, the solution clarified, and the dye reprecipitated with 510 parts of salt. The precipitate is filtered off, washed with 3% brine, and dried at 90° C. This product is used below.

Methylolation (B) A slurry of 20 parts of the dye of Part A in 100 parts by volume of 37% formaldehyde solution adjusted to pH 9.0 with 5 N sodium hydroxide solution is stirred for 8 hours at 25–26° C. and at pH 9.0. The mixture is drowned in 600 parts of ethanol and diluted to 2000 pv. with acetone. Filtration of the precipitate yields the product which is washed with acetone and dried in vacuum at room temperature. The product dyes cotton and viscose rayon a blue shade.

EXAMPLE 2

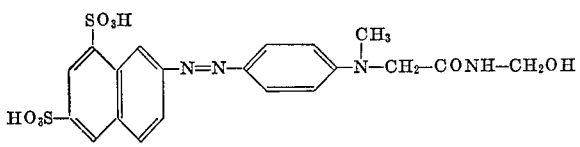

(A) 84.5 parts of 7-aminonaphthalene-1,3-disulfonic acid in a mixture of 500 parts of water, 500 parts of ice and 50 parts by volume of concentrated hydrochloric acid are diazotized with a solution of 14 parts of sodium nitrite in 50 parts of water.

(B) 32.8 parts of N-methyl-N-phenylglycinamide are dissolved in 500 parts of water and 30 parts by volume of concentrated hydrochloric acid.

(C) 100 parts of anhydrous sodium acetate are dissolved in 500 parts of water.

Solutions (B) and (C) are added, simultaneously and with stirring in about 10 minutes to solution (A). The mixture is stirred for about one hour and then 350 parts by volume of sodium hydroxide solution and 600 parts of salt are added. The precipitate is filtered and the cake is redissolved in 3000 parts of water. The clarified solution is reprecipitated with 600 parts of salt to yield the product which is filtered and dried at 60° C.

Methylolation

A slurry of 20.9 parts of the dye prepared above in 100 parts by volume of 37% formaldehyde solution adjusted to pH 9 with 5 N sodium hydroxide solution, is stirred for four hours at 25–26° C. The mixture is drowned in 1000 parts by volume of ethanol and diluted to 2000 parts by volume with acetone. Filtration of the precipitate yields the product which is washed with acetone and dried in vacuum at room temperature. The product dyes cotton an orange shade.

EXAMPLE 3

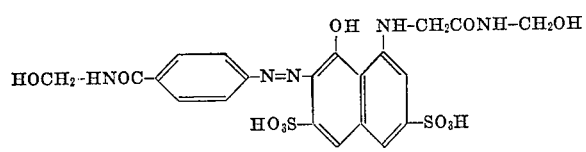

(A) 27.2 parts of p-aminobenzamide in a mixture of 50 parts by volume of concentrated hydrochloric acid, 200 parts of water and 500 parts of ice are diazotized with a solution of 14 parts of sodium nitrite in 50 parts of water (added in 20 minutes) and then stirred for 1 hour.

(B) To a solution of 105 parts of the disodium salt 8-(carbamoylmethylamino)-1-naphthol-3,6-disulfonic acid in 1000 parts of water is added 500 parts of ice and 106 parts of sodium carbonate. The solution prepared in (A) is then added rapidly with stirring and the stirring is continued for one hour; after which 300 parts of salt are added. The mixture is stirred for ½ hour, filtered, the precipitate redissolved in 1000 parts of water, and reprecipitated with 150 parts salt. Filtration and drying at 90° C. yield the compound 3,6-disulfo-2-(p-carbamoylphenylazo)-8-carbamoylmethylamino-1-naphthol.

Bis-methylolation

The procedure of Example 2 is used for the methylolation of the compound prepared above, no adjustment of quantities being necessary. The methylolated product of the above formula is obtained, and gives a bluish red dyeing on cotton.

EXAMPLE 4

CuPc (CO$_2$Na)$_2$ (CONHCH$_2$OH)$_{1.5}$

Copper phthalocyanine is treated with an excess (8 to 1) of phosgene in an aluminum chloride melt to yield an acid chloride containing an average of 3.5 carbonyl chloride groups. This product is reacted with aqueous concentrated (27%) ammonium hydroxide to yield a mixed carboxylic acid-carboxamide product.

79.9 parts of the resulting amide is methylolated with 97.2 parts of an aqueous 37% solution of formaldehyde as in Example 1. The product is salted out from the methylolation mixture, collected by filtration and washed with 10% brine and acetone, and dried in vacuo at 30° C. to yield a dye which affords bluish-green shades of excellent wash fastness on cellulosic textiles.

EXAMPLE 5

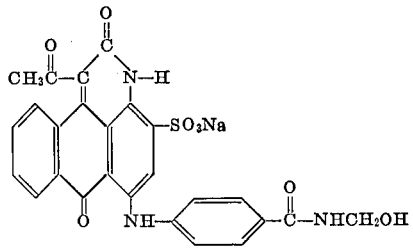

The anthrapyridone precursor is synthesized as follows: 1-amino-4-bromo-anthraquinone-2-sulfonic acid is condensed with p-aminobenzamide as in Example 1. The product is reacted with ethyl acetoacetate in the presence of anhydrous sodium acetate to yield the carbamoyl containing anthrapyridone. 50.3 parts (0.1 m.) of this product, as the free acid, is dissolved in 750 parts of water and the pH adjusted to 9.5. There is then added 64.8 parts (0.4 m. formaldehyde) of a 37% aqueous formaldehyde solution the pH of which is adjusted to 9.5 prior to the addition. The solution is stirred for 8 hours at 25°–30° C. drowned in ethanol, and the precipitated product collected by filtration, washed thoroughly with acetone and dried in vacuo at 30° C. There is obtained a deep violet powder which dyes cellulosic textiles in strongly blue shades of red.

When ethyl benzoylacetate is used in place of ethyl acetoacetate in the above preparation a dyestuff possessing similar shades and properties are obtained.

EXAMPLE 6

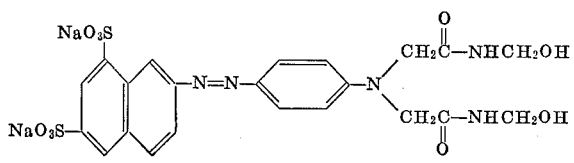

91.0 parts of 7-aminonaphthalene-1,3-disulfonic acid is diazotized and the aqueous slurry of the diazotized salt is stirred into a solution of 62.2 parts of 2,2′-phenyl-iminodiacetamide and 60 parts by volume of concentrated hydrochloric acid in 1000 parts of water. Sufficient anhydrous sodium acetate is then added to make the reaction mixture non-acidic to Congo Red indicator paper. When the coupling is complete, sufficient sodium hydroxide solution is added to make the reaction positive to Brilliant Yellow indicator paper. The temperature is raised to 50° C. and the dyestuff separated by the addition of sodium chloride, filtered off by suction and the cake washed with 20% salt solution and dried in an atmospheric oven at 60° C.

Bis-methylolation 25.3 parts of the above prepared azo dye is dissolved in 500 parts of water and the pH of the solution adjusted to 9.5. There is then added 16.2 parts of a 37% formaldehyde solution the pH of which is pre-adjusted to 10.0. The reaction mixture is warmed to 65° C. with stirring and maintained at this temperature for six hours, the pH being maintained at 9–10 by the addition of 2.5 N sodium hydroxide solution as needed. The reaction is cooled, diluted with 250 parts by volume of ethanol and then drowned in 200 parts by volume of acetone. The precipitated dyestuff is filtered off by suction and dried at normal temperature in vacuo.

The product dyes cellulosic fibers in orange shades.

EXAMPLE 7

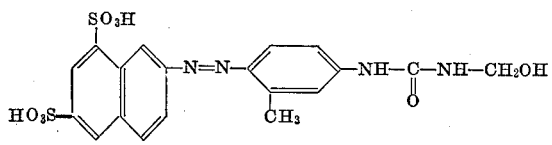

To a solution of 12.6 parts of the dyestuff prepared by coupling the diazo of 7-aminonaphthalene-1,3-disulfonic acid to m-toluidine and 20 parts of urea in 500 parts of water, is added 10 parts by volume of 12 N hydrochloric acid and the mixture is refluxed for 2½ hours. 20 parts of urea and 10 parts by volume of 12 N hydrochloric acid are added and the mixture is refluxed for 8 more hours. The reaction product is treated with 5 N sodium hydroxide (to pH 8) and precipitated with sodium chloride. The precipitated 7-(p-carbamylamino-tolylazo)-naphtholene-1,3-disulfonic acid is filtered and dried at 90° C.

Methylolation

A solution of 4 parts of the urea dye prepared above in 100 parts of water to which is added 4 parts of sodium carbonate and 4 parts of paraformaldehyde, is heated with stirring at 75–80° C. for 32 hours. The solution is evaporated to dryness on a steam bath in vacuo. The residue is extracted with 50 parts by volume of dimethylformamide and the extract precipitated by drowning in 800 parts by volume of acetone. The methylolated product is washed with acetone and dried at 90° C. It dyes cotton yellow shades of good wet fastness.

EXAMPLE 8

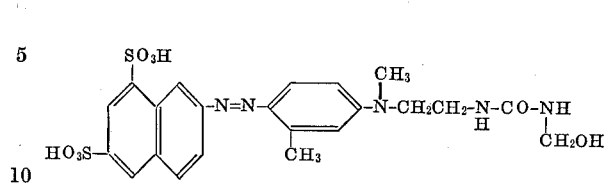

60 parts of N-ethyl-N-m-tolylethylene-diamine are dissolved in 250 parts by volume of glacial acetic acid, and there is added, with stirring, 27.2 parts potassium cyanate. An exothermic reaction ensues, and the solution is stirred until heat evolution has ceased. The reaction is diluted with 250 parts of water, and 400 parts by volume of concentrated ammonium hydroxide is slowly added, whereupon the product separates as an oil. Evaporation of an ether extract of the oil yields [2-(N-ethyl-m-toluidino)ethyl] urea as a fluffy white powder, melting at 99° C.

90.9 parts of 7-aminonaphthalene-1,3-disulfonic acid is diazotized and the diazonium salt stirred into a solution of 66.4 parts of the above urea derivative and 60 parts by volume of concentrated hydrochloric acid in 1000 parts of water. Sufficient sodium acetate is then added to make the reaction mixture non-acid to Congo Red indicator paper. When the coupling is completed, sufficient sodium hydroxide solution is added to make the reaction positive to Brilliant Yellow indicator paper. The dyestuff is separated by addition of sodium chloride at 50° C., filtered off by suction and washed with 10% salt.

Methylolation

The above azo dye is then reacted with 10 parts of 37% formaldehyde solution, and the product isolated, by the procedure outlined in Example 6. The product dyes cellulosic fibers an orange shade.

EXAMPLE 9

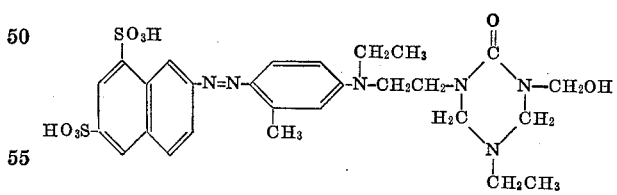

The procedure of Example 8 is followed through the reaction with formaldehyde, but isolation of the methylolation product is not attempted. Instead of the reaction mixture, which contains N,N′-dimethylolated urea dye, is treated with 20.3 parts of 70% aqueous ethylamine. The reaction is then warmed to 90° C. and maintained at this temperature for two hours, filtered hot and the filtrate salted at 55° C. The product is filtered off by suction and washed with 10% sodium chloride solution.

Methylolation

The above azo dye is then reacted with 10 parts of 37% aqueous formaldehyde by the procedure outlined in Example 6.

The product dyes cellulosic fiber reddish yellow.

EXAMPLE 10

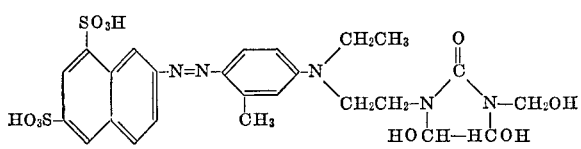

8.0 parts of 75% aqueous glyoxal is dissolved in 500 parts of water and the pH adjusted to 7.5–8.0. There is then added 53.3 parts of the non-methylolated urea dyestuff prepared in Example 8, and the reaction is stirred at 30° C. for 24 hours. The water is removed by vacuum stripping, the residue treated with a mixture of 200 parts of acetone, filtered and the cake washed with 100 parts acetone.

Methylolation

The above azo dye is then reacted with 16.2 parts of 37% aqueous formaldehyde solution by the procedure outlined in Example 6.

The product dyes cellulosic fibers reddish yellow.

EXAMPLE 11

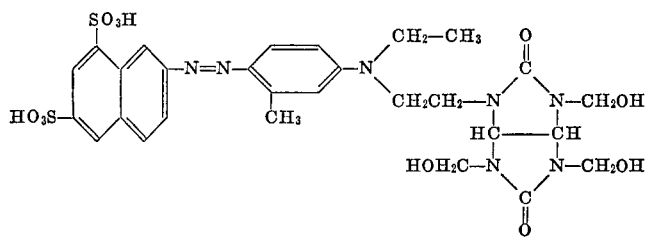

59.3 parts of the non-methylolated dyestuff prepared in Example 10 is dissolved in 500 parts of water and the pH adjusted to 7.0. There is then added 9 parts of urea, and the reaction is stirred at 20° C. for twenty hours. The dyestuff is separated by addition of sodium chloride, filtered off with suction and pressed dry.

Tris-methylolation

The above wet cake is reacted with 48.6 parts of a 37% aqueous formaldehyde solution by the procedure outlined in Example 6.

The product dyes cellulosic fibers in reddish yellow shades.

EXAMPLE 12

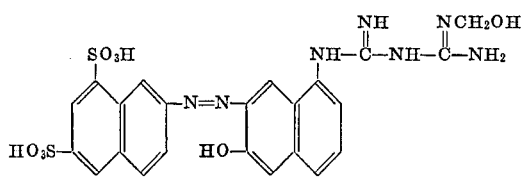

Preparation of the biguanide dye 14.0 parts (0.05 M) of 7-hydroxy-1-naphthylbiguanide hydrochloride prepared according to U.S. Patent 1,822,065 are dissolved in 100 parts of water by the addition of 60 parts by volume of 5 N sodium hydroxide solution. To this solution is added the diazo prepared from 15.2 parts of 7-aminonaphthalene-1,3-disulfonic acid. When coupling is complete, the product is filtered off. It is then slurried in 300 parts by volume of 10% brine, heated to 60° C, cooled to 20° C, filtered and dried at 60° C.

Methylolation

To a mixture of 50 parts of water and 50 parts by volume of methanol are added 12.2 parts of the azo product prepared above. The slurry is heated to reflux with stirring. Then a solution made by mixing 6.0 parts of paraformaldehyde, 25 parts of water, 25 parts by volume of methanol, and 5 N sodium hydroxide solution to give pH 9–9.5 is added gradually. The mixture is stirred at reflux until the reaction is complete. The solution obtained is then clarified by filtration and poured into 4000 parts by volume of acetone. The product is filtered and dried at 40° C. in vacuum. It gives a bluish red color when dyed in cotton and viscose rayon.

EXAMPLE 13

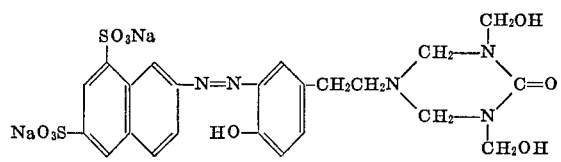

Preparation of the triazinone dye 12.0 parts of N,N'-dimethylolurea are dissolved in 500 parts of water and there is added with stirring 49.4 parts of the azo dyestuff prepared by coupling diazotized 7-aminonaphthalene-1,3-disulfonic acid into p-(2-aminoethyl) phenol. The reaction mixture is then stirred and heated at 90° C. for three hours, filtered hot and the filtrate salted at 50° C., cooled to 20° C. and the product filtered off by suction, washed with 10% sodium chloride solution and dried in an atmospheric oven at 60° C.

Bis-methylolation 58.0 parts of the above dyestuff is then reacted with 32.4 parts of a 37% aqueous formaldehyde solution as in Example 6.

The product dyes cellulosic fibers in reddish brown shades.

EXAMPLE 14

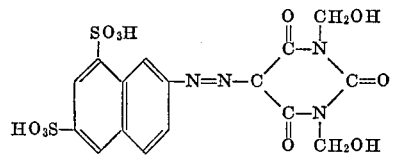

Preparation of the imide dye

The diazo from 13.5 parts of 7-aminonaphthalene-1,3-disulfulfonic acid is added at 10° C. to a slurry of 7.0 parts of barbituric acid in 150 parts of water and 100 parts by volume of 20% sodium carbonate solution. The pH is about 8–9. The resulting bright yellow slurry is stirred for 1 hour at 25° C. and filtered. The cake is washed with 50 parts of water. The wet cake is dissolved in 600 parts by volume of 10% brine solution at the boil and filtered hot. The filtrate is cooled at 25° C. and the resulting yellow precipitate collected by filtration. The cake is washed with 50 parts by volume of 10% brine and dried at 75° C. for 18 hours.

Bis-methylolation 15.0 parts of the above compound is slurried in 150 parts of water. The pH is adjusted to 9.0 with 5 N NaOH solution and 81 parts of 37% formalin is added. The whole is heated at 40–45° C. with good stirring for 1½ hours and is poured into 3000 parts by volume of acetone, and the resulting precipitate collected by filtration. The cake is washed with 250 parts by volume of acetone and dried at 40° C. for 24 hours. The product dyes cotton a brilliant greenish yellow shade.

EXAMPLE 15

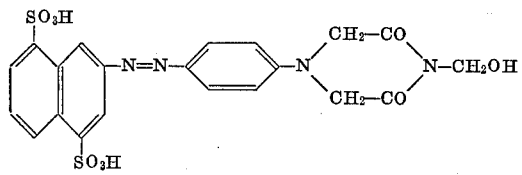

9.3 parts of aniline is fused at 200° C. for 2 hours with 18.6 parts of chloroacetamide in the presence of 16.8 parts of sodium bicarbonate (under $N_2$ atmosphere). The product thus obtained is dissolved in 500 parts of water and 30 parts by volume of acetic acid. 50 parts of sodium acetate are added to the solution and the diazo solution prepared from 30.3 parts of 7-aminonaphthalene-1,5-disulfonic acid is then added rapidly. Coupling is rapid. The dye is salted out after 1 hour, filtered and dried at 90° C.

Methylolation

The above dye is dissolved in a solution of 250 parts by volume of 37% formaldehyde solution, adjusted to pH 9, is stirred for 4 hours at 30–40° C. The solution is drowned in 3000 parts by volume of acetone, filtered, washed with acetone and dried at room temperature in vacuum. The dye gives an orange shade on cellulosic fibers.

EXAMPLE 16

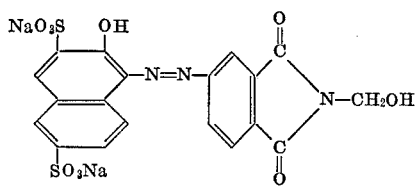

Methylolation 50.7 parts of the azo dye prepared by coupling diazotized 4-aminophthalimide into 2-naphthol-3,6-disulfonic acid is reacted with 16.2 parts of aqueous 37% formaldehyde solution as in Example 6.

The product dyes cotton an orange shade.

EXAMPLE 17

$CuPc(SO_3H)_{1.25}(SO_2NH_2)_{1.1}(SO_2NHCH_2OH)_{1.0}$ 24 parts (0.027 m.) of the reaction product obtained by treating chlorosulfonated copper phthalocyanine with cold, saturated aqueous ammonia is dissolved in 500 parts of water and the pH of the resulting solution adjusted to 9.5 with dilute sodium hydroxide solution. There is then added with stirring 17.9 parts (0.22 m. formaldehyde) of a 37% aqueous formaldehyde solution, the pH of which is adjusted to 9.5 prior to the addition. The solution is stirred 24 hours at room temperatures (25°–30° C.) filtered and drowned in acetone. The precipitated product is collected by filtration and dried in vacuo at 25°–30° C. to yield 31.9 parts of a bright green-blue powder which dyes cotton bright turquoise shades of excellent fastness to washing.

EXAMPLE 18

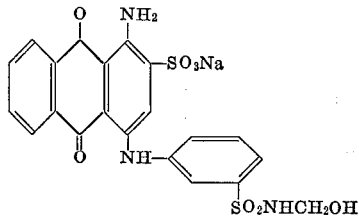

49.5 parts of the dye obtained by condensing an aqueous solution of 1-amino-4-bromoanthraquinone-2-sulfonic acid sodium salt with metanilamide in the presence of cuprous chloride and sodium carbonate, is dissolved in 1000 parts of water and the pH adjusted to 9.0 by addition of dilute hydrochloric acid. There is then added 32.4 parts of a 37% aqueous formaldehyde solution the pH of which is adjusted to 9.0. The solution is stirred at room temperatures (25° to 30° C.) for 48 hours and treated with clean salt to a light-colored runout. The product is collected by filtration, washed with 10% brine followed by acetone and dried in vacuo at 30° C. to yield a blue powder which dyes cellulosic textiles slightly red shades of blue having enhanced fastness to washing.

Use of 1-amino-4-bromoanthraquinone-2,5-(7)-disulfonic acid disodium salt or of 4-bromo-1-methylamino-anthraquinone-6-sulfonic acid yields dyes having similar properties.

EXAMPLE 19

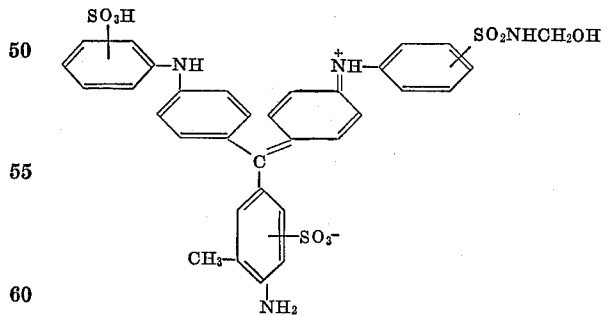

Acid Blue 22 (C.I. 42755), a trisulfo triphenylmethane dye, is converted to the trisulfonyl chloride by heating in an excess of chlorosulfonic acid at 100° C. for one hour. The mixture is poured on ice, the trisulfonyl chloride filtered off, and the filter cake stirred in 28% aqueous ammonia at 0° C. for fifteen minutes. The product, which contains an average of 1.2 sulfamoyl groups and 1.8 sulfonate groups, is isolated by salting, filtered, washed with brine and pressed dry. It is methylolated by the procedure of Example 18, and the methylol product collected by salting-out and filtration. The product dyes cotton in a blue shade fast to washing.

EXAMPLE 20

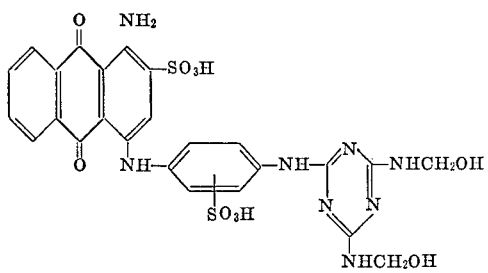

106.6 parts 1 - amino - 4 - p-acetamidoanilinoanthraquinone-2-sulfonic acid is sulfonated in 5% oleum at 40–45° C. during 4 hours, and the product is treated in 5% aqueous caustic at 90° C. for hydrolysis of the acetamido group. The resultant 1-amino-4-p-aminoanilinoanthraquinonedisulfonic acid, is dissolved in 800 parts of water at 90° C. 20 parts by volume of 5 N HCl is added to a positive test on Congo Red paper. 50 parts of sodium acetate is added to a pH 4–5, the solution heated to reflux, and 27.6 parts of 2,4-diamino-6-chloro-s-triazine is added. 58 parts by volume of 20% sodium carbonate is added dropwise during 1½ hours at reflux, keeping the pH at 4–5. The thick precipitate which is formed during the reaction is filtered off at 25° C. The cake is dissolved in 1500 parts of water at the boil with addition of caustic to a positive phenolphthalein test. The whole is filtered hot and the blue dye salted out by addition of 300 parts of sodium chloride. The whole is cooled to 25° C. and filtered. The cake is dried at 85° C. for 18 hours.

Methylolation 64.2 parts of the above diaminotriazinyl derivative (as the disodium salt) is dissolved in 1000 parts of water and the pH of the solution adjusted to 9.5 by the addition of dilute hydrochloric acid. There is then added 64.8 parts of a 37% aqueous formaldehyde solution the pH of which is adjusted to 9.5 prior to the addition. The solution is heated with stirring at 65° C. for three hours, cooled to 30° C., and drowned in 1500 parts by volume of acetone. The precipitated product is collected by filtration, washed with 500 parts by volume of acetone and dried in vacuo at 30° C. to yield a deep blue powder which affords bright blue dyeings of excellent fastness to washing on cellulosic textiles.

EXAMPLE 21

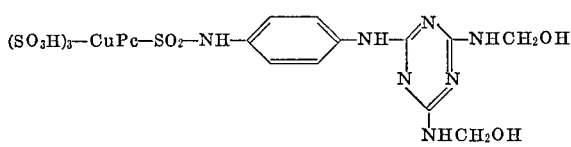

Preparation of the copper phthalocyanine-diaminotriazine dye

Copper phthalocyaninetetrasulfonyl chloride is reacted with an equimolar amount of p-aminoacetanilide, and the remaining chlorosulfonyl groups and the acetamido group are hydrolyzed to give trisulfo copper phthalocyanine-sulfon-p-aminoanilide. 52.8 parts of the trisodium salt of this compound are reacted with 8.0 parts of 2,4-damino-6-chloro-s-triazine under the conditions of Example 20, and the product similarly isolated.

Methylolation

The diaminotriazine derivative is then methylolated by the procedure of Example 20 to form the product of the above formula, which gives greenish-blue dyeings on cotton.

EXAMPLE 22

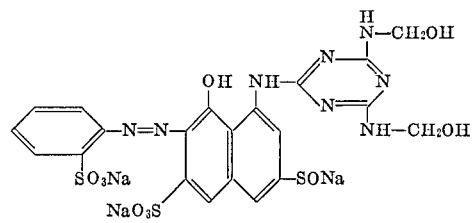

Procedure A 61.7 parts of the dichloro-s-triazinyl derivative of the azo dye derived from coupling diazotized orthanilic acid into an alkali solution of 1-amino-8-hydroxynaphthalene-3,6-disulfonic acid is added with stirring at 10° C. to 600 parts by volume of ammonium hydroxide (28%). The slurry is stirred one hour at 5–10° C., allowed to reach 30° C. and then slowly warmed with stirring to 90° C. at which temperature the reaction is maintained for one hour. The resulting solution is cooled to 70° C. and the dyestuff precipitated by the addition of 500 parts by volume of concentrated hydrochloric acid and filtered off by suction. The cake is washed with 500 parts of water and dried in an atmospheric oven at 90° C. yielding 60.5 parts of the red dyestuff.

Methylolation 67.8 parts of the diamino-s-triazinyl dyestuff prepared above is reacted with 64.8 parts of a 37% formaldehyde solution by the procedure outlined in Example 20. There is obtained a dye which yields bluish-red dyeings of outstanding wash-fastness on cellulosic fibers.

Procedure B 57.4 parts of 1-amino-8-hydroxynaphthalene-3,6-disulfonic acid is dissolved in 400 parts of water and sufficient sodium acetate is added to give pH 4–5. The solution is heated to reflux and there is added with good stirring 27.6 parts of 2,4-diamino-6-chloro-s-triazine. The solution is refluxed for 1½ hours during which time a solution of 15% sodium carbonate is added as needed to maintain a pH of 4–5. The reaction is cooled to 25° C. and the product separated by addition of concentrated hydrochloric acid, filtered off by suction, washed free of acid with 10% sodium chloride solution and dried in an atmospheric oven at 60° C.

Into an alkaline solution of the above intermediate, there is then coupled in the known manner diazotized orthanilic acid. The resulting dye is then methylolated as in Procedure A above.

Procedure C

The azo dye prepared by coupling diazotized orthanilic acid into an alkaline solution of 1-amino-8-hydroxy-3,6-disulfonic acid is condensed with 2,4-diamino-6-chloro-s-triazine by the method outlined in Procedure B, and the resulting diaminotriazinyl derivative methylolated as in Procedure A.

In the following table are listed other methylolaminotriazinyl azo dyes which can be made by the above procedures. In each case the "diazo component" is coupled into the "coupling component" by known methods. The product is then reacted with the "triazine component" unless a triazine ring is already present in the coupled molecule. The aminotriazinyl derivative thus formed is finally reacted with formaldehyde.

3,501,259
TABLE I
| Diazo component | Coupling component | Triazine component | Shade of methylolated dye on cellulosic fibers |
|---|---|---|---|
| 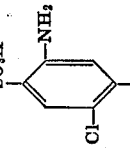 | 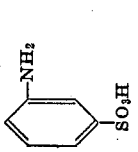 | Cyanuric chloride, followed by ammonolysis | Bluish red. |
| 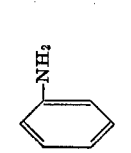 | 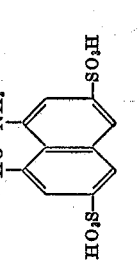 | ......do...... | Red. |
| 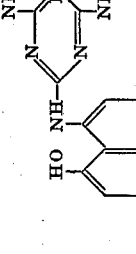 | 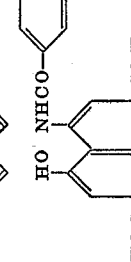 | ......do...... | Red. |
|  |  | ......do...... | Bluish red. |
| 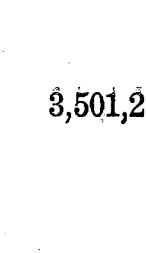 | | ......do...... | Do. |
| | | ......do...... | Violet. |

TABLE I—Continued
| Diazo component | Coupling component | Triazine component | Shade of methylolated dye on cellulosic fibers |
|---|---|---|---|
| 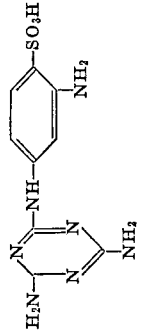 | 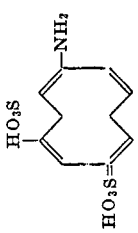 | | Bluish red. |
| 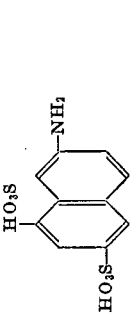 | 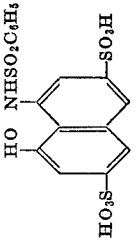 | 2,4-diamino-6-chloro-s-triazine | Yellow. |
| 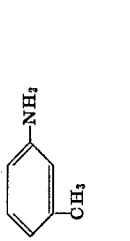 | 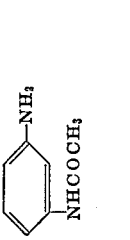 | Cyanuric chloride, followed by ammonolysis | Do. |
|  (via O-tosyl derivative) | 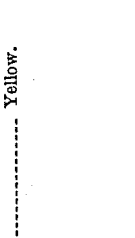 | do | Orange. |
|  |  | | Maroon. |
| 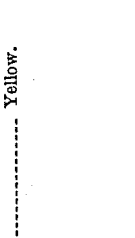 |  | Cyanuric chloride, followed by ammonolysis | Orange. |

TABLE I—Continued

| Diazo component | Coupling component | Triazine component | Shade of methylolated dye on cellulosic fibers |
|---|---|---|---|
| 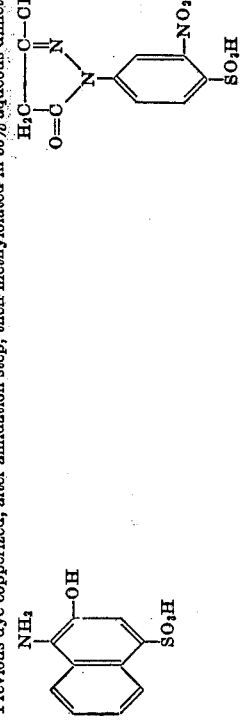 | Previous dye copperized, after amidation step; then methylolated in 50% aqueous dimethylformamide solution | | Bluish red. |
| | 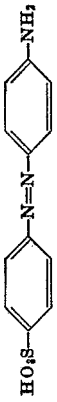 | 2,4-diamino-6-chloro-s-triazine | Do. |
| 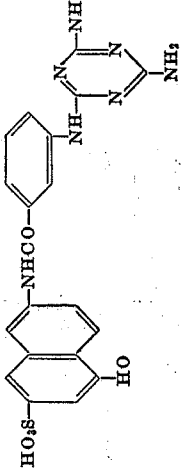 (after coupling, the 1:1 Cu complex is made, and the nitro group reduced) |  | | Maroon. |
| 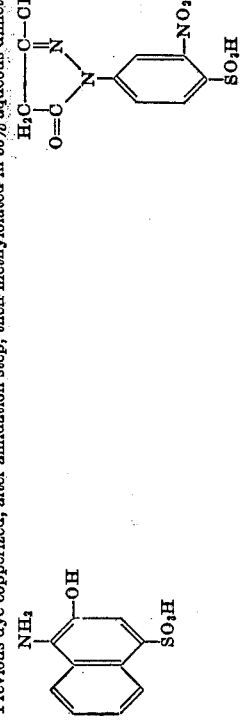 | 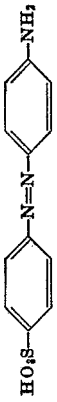 (coupled alkaline) | Cyanuric chloride, followed by ammonolysis | Red. |
| 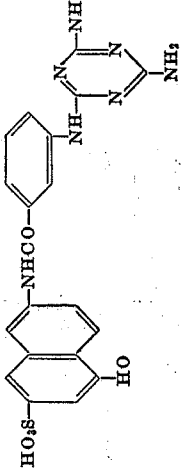 (reduce nitro after coupling) |  (coupled acid) | 2,4-diamino-6-chloro-s-triazine | Red. |
| 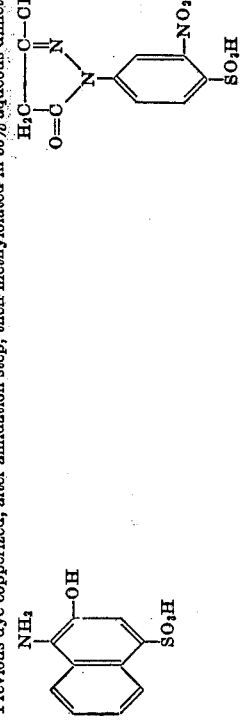 | 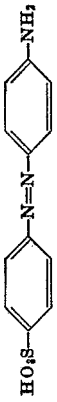 (coupled acid) | | Red. |

TABLE I—Continued

| Diazo component | Coupling component | Triazine component | Shade of methylolated dye on cellulosic fibers |
|---|---|---|---|
| (structure) | (structure with NHCOCH₃, OH, SO₃H on naphthalene) | ......... | Orange. |
| (structure) | (pyrazolone with SO₃H phenyl) | ......... | Greenish yellow. |
| (structure with CH₃CO-N, CH₃, NH₂) | (naphthalene with diaminotriazine-NH, OH, HO₃S) | ......... | Red. |
| (naphthalene diazo with NH₂, HO₃S, SO₃H) | (naphthalene with NH₂, OH, HO₃S, SO₃H) | (triazine with Cl, NH₂, NH-phenyl-SO₃H) | Bluish red. |
| (structure) | (aniline with NH₂, CH₃) | (triazine with Cl, NH₂, OCH₃) | Yellow. |
| (structure with triazine-NH, N(C₂H₄OH)₂, SO₃H, NH₂) | (naphthalene with HO, NHCOCH₃, SO₃H, HO₃S) | ......... | Bluish red. |

EXAMPLE 23

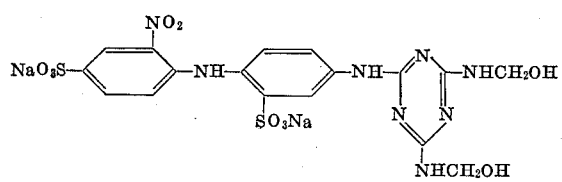

54.2 parts of the diaminotriazinyl derivative of 4'-amino-2-nitrodiphenylamine-3',4-disulfonic acid disodium salt (obtained by the ammonolysis of the corresponding dichlorotriazinyl derivative) is reacted with 64.8 parts of a 37% aqueous formaldehyde solution by the methylolation procedure of Example 20. A bright yellow powder is obtained which dyes cellulosic textiles in yellow shades having excellent wash fastness.

EXAMPLE 24

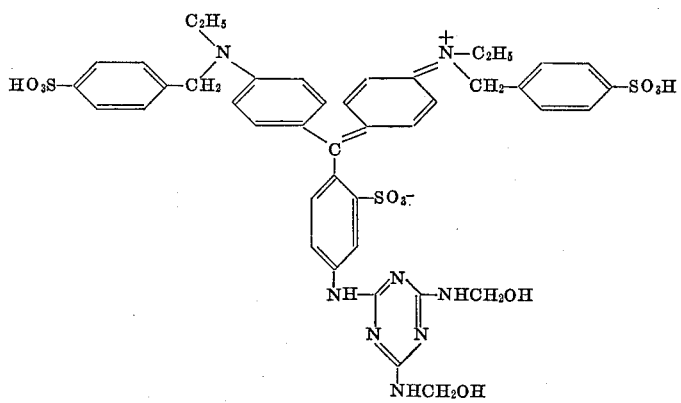

A mixture is prepared of 23.8 parts of 4-nitro-2-sulfobenzaldehyde, 58.2 parts of N-ethyl-N-benzylanilinesulfonic acid, and 38 parts of concentrated sulfuric acid with sufficient water to give a total volume of 150 parts. The mixture is heated at reflux for 24 hours, diluted to 1000 parts by volume, and neutralized with caustic. The nitro group of the leuco base is then reduced by addition of sodium hydrosulfide portionwise at about 50° C. The amino leuco base is isolated by salting with sodium sulfate, filtration, and washing with sodium sulfate solution. The amino leuco base is then reacted with 10 parts of 2,4-diamino-6-chloro-s-triazine in aqueous medium at pH 4–5 at reflux for 2 hours, and the diaminotriazinylamino leuco base isolated by salting. Oxidation to the dyestuff is carried out in 500 parts of 2.5% sulfuric acid, containing 12 g. oxalic acid crystals, cooled to 0° C., by the addition of 10 parts of sodium dichromate portionwise over a period of 30 minutes. The product is salted out with sodium sulfate and recovered by filtration and washing with 10% sodium sulfate solution to a negative Congo Red test. Methylolation is carried out by the procedure of Example 20. The dye gives greenish blue shades on cotton and rayon.

EXAMPLE 25

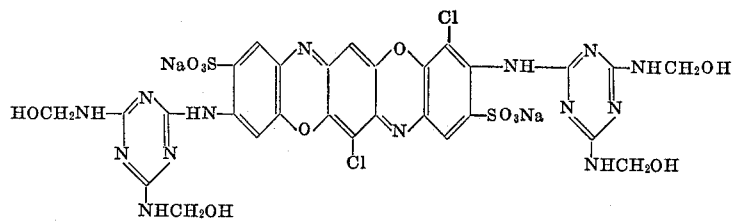

The dioxazine dyestuff obtained by the known method of condensing two moles of p-phenylenediamine sulfonic acid with chloranil, closing the ring and sulfonating the product of ring closure, is converted to the diaminotriazinyl derivative by reaction with 2,4-diamino-6-chloro-s-triazine. 11.9 parts of the tetrasodium salt of the diaminotriazinyl derivative is methylolated with 129.6 parts of a 37% aqueous formaldehyde solution as in Example 20 and the product isolated in the same manner. A dye is obtained which gives grayish-blue shades on cotton possessing excellent fastness to washing.

EXAMPLE 26

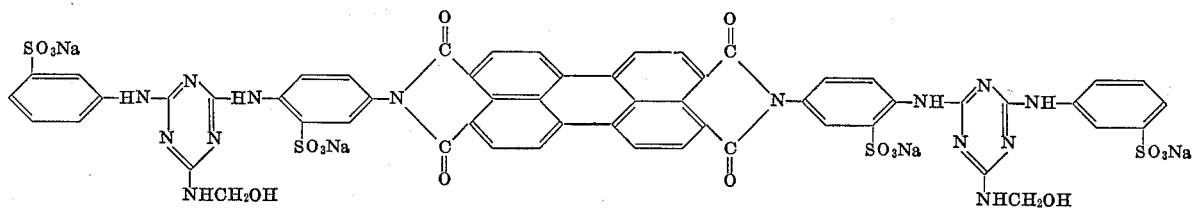

77.6 parts as the disodium salt of the dicondensation product of perylene-3,4,9,10-tetracarboxylic acid with p-phenylenediamine sulfonic acid are dissolved in 1500 parts of water, cooled to 0°–5° C. and added to a solution of 36.6 parts of cyanuric chloride in 200 parts by volume of acetone. A solution of 10% sodium carbonate is added as required to maintain a pH of 6.5. Upon the absence of a free amine test, there is added 34.6 parts of metanilic acid and the temperature raised to 50°–55° C., 10% Na₂CO₃ solution again being added as required to maintain a pH of 6.5. After one and one-half hours at 55° C., 500 parts by volume of concentrated (27%) ammonium hydroxide is added and passage of ammonia gas through the solution is begun. The solution is refluxed for five hours, constantly passing through ammonia gas, cooled to 80° C., filtered and the product salted out, collected by filtration, washed with 10% brine and dried at 60° C. in an atmospheric oven.

67.5 parts of the above intermediate (as the sodium salt) is dissolved in 1500 parts of water and methylolated with 32.4 parts of a 37% aqueous formaldehyde solution by the procedure outlined in Example 20. The product is isolated by salting out, filtration and drying at 30° C. in vacuo. The dyestuff thus obtained gives bluish red dyeings of excellent wash fastness on cellulosic textiles.

EXAMPLE 27

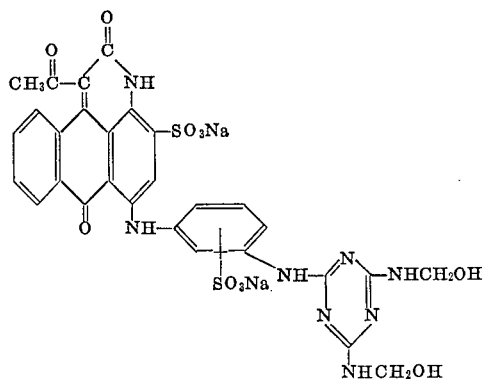

The anthrapyridone precursor is synthesized by the following sequence of operation: 1-amino-4-bromoanthraquinone-2-sulfonic acid is condensed with N-acetyl-m-phenylenediamine, the product sulfonated and the acetyl group removed by alkaline hydrolysis, and then reacted with ethyl acetoacetate in the presence of anhydrous sodium acetate. The anthrapyridone amine is then reacted with cyanuric chloride and the remaining chlorine atoms replaced by ammonolysis.

57.7 parts (0.1 m.) of the above diaminotriazinyl intermediate is dissolved in 1000 parts of water and the pH adjusted to 9.5 with aqueous dilute sodium hydroxide solution. There is then added 64.8 parts (0.4 m. formaldehyde) of a 37% aqueous formaldehyde solution, the pH of which is adjusted to 9.5 prior to the addition. The solution is stirred at 65° C. for three hours at a pH of 9.5, cooled to 25° C., drowned in acetone and the product collected by filtration and washed thoroughly with acetone. The resulting product dyes cellulosic textiles bluish red shades of outstanding fastness to washing and light.

The use of ethyl benzoylacetate in place of ethyl acetoacetate yields a dyestuff similar in properties.

EXAMPLE 28

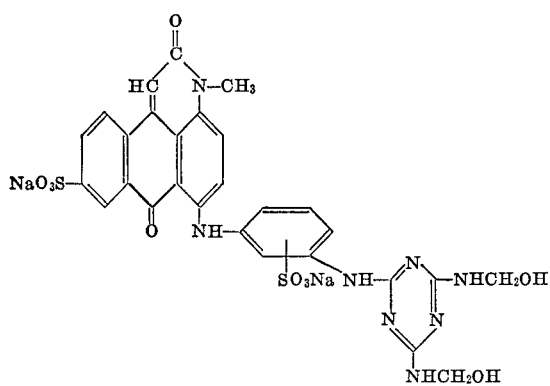

The anthrapyridone precursor is synthesized in the following manner: 4-bromo-1-methylaminoanthraquinone-6-sulfonic acid is condensed with N-acetyl-m-phenylenediamine, the product acylated with acetic anhydride and cyclized to the anthrapyridone with aqueous caustic solution. This product is then sulfonated, the acetyl group removed by alkaline hydrolysis and the free amino group reacted with cyanuric chloride and finally with ammonia.

The methylolation is carried out as in Example 20 to yield a product which dyes cotton blue shades of red possessing excellent fastness to washing and light.

EXAMPLE 29

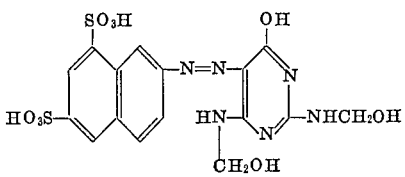

The diazo prepared from 30.5 parts of 7-aminonaphthalene-1,3-disulfonic acid is added during ½ hour to a well stirred cold (10° C.) solution of 12.7 parts of 2,4-diamino-6-hydroxy-pyrimidine in 100 parts of water and 100 parts by volume of NaOH.

The resulting orange solution is stirred for 1 hour at 25° C. and filtered. The filtrate is made acid to Congo Red paper with concentrated HCl forming a yellow-orange precipitate. The solid is collected by filtration, washed with 150 parts of water and dried at 60° C. for 48 hours.

The sample is methylolated as in Example 20. The product gives a greenish yellow shade when dyed on cotton.

EXAMPLE 30

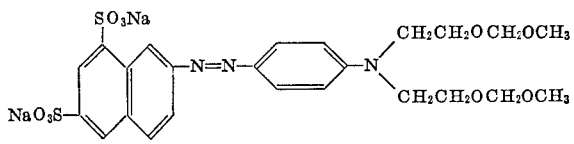

10.7 parts of the coupling product of 7-aminonaphthalene-1,3-disulfonic acid diazo to 2,2'-phenyliminodiethanol dissolved in 50 parts by volume of dimethylformamide is cooled to about 3° C. To this solution is added 4.5 parts by volume of chloromethyl methyl ether over 5 minutes with good agitation. The reaction mixture is agitated at 0–5° for one-half hour, allowed to come to 25–30°, and stirred at this temperature for about 16 hours. The clear solution is treated with an excess of pulverised solid sodium carbonate during which time the temperature rises to 33°. It is immediately filtered, the filtrate drowned in 1000 parts by volume of acetone. The precipitated dye is collected by filtration, washed with acetone and ether, then dried overnight at 50° C. The product gives an orange shade when dyed on cotton.

EXAMPLE 31

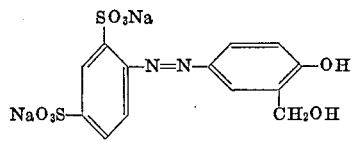

91.0 parts of 7-aminonaphthalene-1,3-disulfonic acid is diazotized, and the aqueous slurry of the diazonium salt is stirred into a solution of 37.2 parts o-hydroxybenzyl alcohol, 16 parts sodium hydroxide and 9.0 parts anhydrous sodium carbonate in 500 parts of water. When the coupling is completed, the dyestuff is precipitated by the addition of sodium chloride, filtered off by suction, washed with 20% salt solution and dried in an atmospheric oven at 60° C.

The product dyes cellulosic fiber in reddish-yellow shades.

EXAMPLE 32

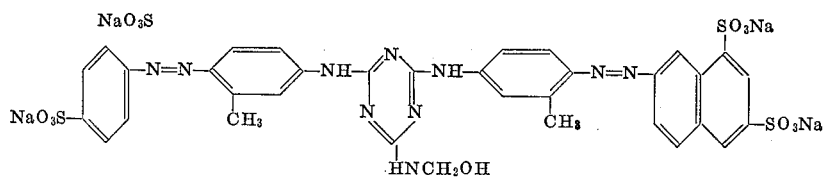

9.31 parts of the azo dye derived from coupling diazotized 7-aminonaphthalene-1,3-disulfonic acid into m-toluidine is dissolved in 1000 parts of water, and there is added with stirring at 0–5° C. a solution of 3.69 parts of cyanuric chloride in 50 parts by volume of acetone. A 10% sodium carbonate solution is added as needed to keep the reaction negative to Congo Red and positive to methyl red indicator papers. The slurry is stirred for 3 hours at 0–5° C. and then there is added another 9.31 parts of the dyestuff and the temperature is raised to 60° C. maintaining the pH as indicated above. After 5 hours at 60° C. there is added 500 parts by volume of 28% ammonium hydroxide and the solution refluxed at 99° C. for ten hours. The solution is cooled to 50° C. and the product separated by the addition of sodium chloride, filtered off by suction, washed with 15% sodium chloride solution and dried in an atmospheric oven at 60° C.

10.2 parts of the above prepared dyestuff is then reacted with 8.1 parts of a 37% formaldehyde solution as in Example 20. A dyestuff yielding reddish-yellow shades on cellulosic fibers is thereby obtained.

EXAMPLE 33

The dyestuff which is used in this example in reaction with the resin monomers of Table II is prepared by coupling the diazo of 7-aminonaphthalene-1,3-disulfonic acid to m-toluidine. The $$\overset{H}{\underset{D-N-}{}}$$

of the table is therefore

[Structure: naphthalene with SO₃H and HO₃S groups, linked -NH-phenyl(CH₃)-NH-]

To react the resin monomer with the dyestuff, conditions must be chosen to avoid polymerization of the resin monomer itself. To make the $$\overset{H}{\underset{D-N-}{}}$$

resin substitution product as in A, B, C, D and E below, a nearly neutral to mildly alkaline aqueous medium at 75° C. using 1.1 moles of resin per mole of dye is necessary. With A, B and C below, the reaction proceeds at pH 7.3, 7.1 and 7.1 respectively and is complete within three hours. With D, the reaction is complete within a half hour at pH 6.1. With E, the reaction is run at a pH of 8.9 at one hour. With F, two moles of dye are used for each mole of resin and the reaction is complete within forty-five minutes at pH 7.8.

All the products give similar reddish yellow shades when dyed on cellulosic fibers.

TABLE II

| Experiment No. | Resin monomer | Reactive dye obtained |
|---|---|---|
| A | Dimethylolethyleneurea | D—N(H)—CH₂—N(cyclic urea ring with N—CH₂OH) |
| B | bis-Methoxymethylurea | D—N(H)—CH₂—NH—C(=O)—NH—CH₂OCH₃ |
| C | Dimethylolethyltriazinone | D—N(H)—CH₂—N(triazinone ring with N—CH₂OH and N—CH₂CH₃) |
| D | bis-Methoxymethylmethylol-melamine | D—N(H)—CH₂—NH—(triazine)—NH—CH₂OCH₃, NH—CH₂OCH₃ |
| E | Hexamethylol-melamine | D—N(H)—CH₂—N(triazine with HOCH₂, N(CH₂OH)₂, N(CH₂OH)₂) |
| F | ...do... | D—N(H)—CH₂—N(triazine)—CH₂—N(H)—D, with HOCH₂, CH₂OH, N(CH₂OH)₂ |

EXAMPLE 34

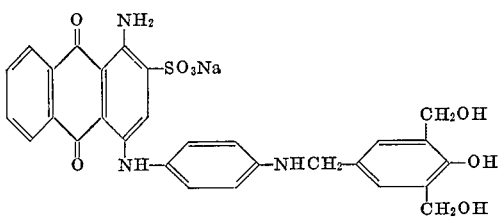

12 parts of 1-amino-4-(4'-aminoanilino)anthraquinone-2-sulfonic acid sodium salt is dissolved in 100 parts of water and the pH adjusted to 7.0 by the addition of dilute hydrochloric acid. There is then added a solution of 11.6 parts of the sodium salt of 2,4,6-trimethylolphenol in 100 parts of water, the pH of which is adjusted to 7.0 with dilute hydrochloric acid. The resulting solution is stirred at 40° C. for 48 hours with maintenance of the pH at 7.0, poured into 1500 parts by volume of isopropyl alcohol, and the precipitated product collected by filtration and washed with isopropyl alcohol. The cake is dissolved in 1500 parts of water at 50° C., the solution filtered and the filtrate treated with 20 parts of sodium chloride. The product is collected by filtration and dried in vacuo at 30° C. to yield 11.8 parts of a material which dyes cellulosic fibers green shades of blue possessing enhanced fastness to washing.

Similar dyestuffs are obtained by employing 4-(4'-aminoanilino)-1-methylamino-anthraquinone-6-sulfonic acid sodium salt or 1-amino-4-(4'-amino-3'-sulfo) anthraquinone-2-sulfonic acid disodium salt.

In place of the starting anthraquinone dye of the above example, one may use bis-aminomethyl copper phthalocyanine disulfonic acid, obtained as described in U.S. Patent 2,761,868, and four equivalents of trimethylolphenol. The product contains two residues of trimethylolphenol, and dyes cotton a bright turquoise shade.

In place of the starting anthraquinone dye of the above example, one may use the aminoazo dye obtained by coupling orthanilic acid diazo to 8-amino-1-naphthol-3,6-sulfonic acid. The product dyes cotton a red shade. When the starting material is the aminoazo dye obtained by coupling 2-aminonaphthalene-6,8-disulfonic acid diazo to m-toluidine, the product is a yellow dye, fast on cotton.

EXAMPLE 35

17.7 parts of 80 square cotton is impregnated at room temperature in a pad bath consisting of 1.93 parts of the dyestuff of Example 2, 3.9 parts by volume of a 10% aqueous zinc nitrate solution and 96.1 parts of water. The padded fabric is squeezed, dried in air at 150° F. and then cured in an oven at 350° F. for 1½ minutes. The fabric is then washed in a 0.1% soda ash solution containing a non-ionic detergent at 110° F. A bright orange dyeing with extremely good wet fastness properties is obtained.

Instead of zinc nitrate, equal parts of other acid donors may be used with similar results, such as isopropanolamine hydrochloride, magnesium chloride, ammonium nitrate, and zinc fluoborate. When 2.0 parts of a 10% solution of oxalic acid is used as the acid donor a near-quantitative color yield of excellent fastness is obtained.

When the dyestuff of Example 31 is used in the above example, the curing time is advantageously increased to five minutes for optimum color yield, giving a reddish yellow shade.

EXAMPLE 36

80 square cotton is impregnated from a solution consisting of 5.36 parts of bis-methoxy-methyl-monomethylol melamine, 7.15 parts of the dyestuff of Example 20 and 2.29 parts of magnesium chloride in 1000 parts of water. The fabric is squeezed to 80% pick-up of pad liquor, dried at 225° F., and heated at 350° F. for one and one-half minutes. The fabric is washed in a solution of 0.25% non-ionic detergent and 0.5% soda ash at 110° F., rinsed and dried. There is obtained a reddish-blue dyeing of high wet fastness and good wrinkle recovery properties when tested by a Wrinkle Recovery Tester.

Other catalysts that may be used in equal amounts are zinc nitrate, ammonium sulfate, isopropanolamine hydrochloride, zinc fluoborate and ammonium phosphate. Similar results are obtained.

Other resin monomers that may be used in the above process in equal amounts and with similar results are bis-methoxymethylurea, dimethylolethyleneurea, dimethylol-N-ethyltriazinone, bis-methoxymethyluron and dimethylol-4,5-dihydroxyimidazolidone. When 2,4,6-trimethylolphenol is the resin monomer used, no catalyst is required for obtaining similar results.

I claim:
1. A fiber-reactive dyestuff of the formula

$$D(-X-B-)_n(-CH_2OZ)_n$$

wherein:
D is the chromophoric aromatic residue of a member selected from the group consisting of azo dyes, anthraquinone dyes, phthalocyanine dyes, anthrone dyes, indigoid dyes, xanthene dyes, triarylmethane dyes, diarylmethane dyes, nitro dyes, nitroso dyes, oxazine dyes, thiazine dyes, azine dyes and acridine dyes with $n$ free valences;

X is a divalent bridging group, joining the aromatic moiety of D with B, selected from the group consisting of a covalent bond, $-NR''-$, $-NAcyl-$, $-O-$, $-S-$, $-(CH_2)m-$, $-(CH_2)m\ NR''-$, $-CO-$, $-SO_2-$, $-CONR''-$ and $-SO_2NR''-$ wherein $R''$ is a member selected from the group consisting of hydrogen and lower alkyl and $m$ is a positive integer;

B is a dehydro radical of a group with an active hydrogen, said group being selected from carbamoyl, carbamoylalkyl, carbamoylaryl, ureido, cyclized ureido, imido, sulfamoyl, aminotriazinyl and ortho-unsubstituted hydroxyphenyl, the radical ($CH_2OZ$) being attached to B at the position of the active hydrogen;

Z is a member selected from the group consisting of hydrogen and lower alkyl; and $n$ is a positive integer less than seven.

2. The dyestuff of claim 1 wherein D is the residue of an arylmonoazo dyestuff having from one to three sulfo groups, and B is the dehydro radical of a carbamoyl group.

3. The dyestuff of claim 1 wherein D is the residue of an arylmonoazo dyestuff having from one to three sulfo groups, and B is the dehydro radical of a sulfamoyl group.

4. The dyestuff of claim 1 wherein D is the residue of an arylmonoazo dyestuff having from one to three sulfo groups, and B is the dehydro radical of an aminotriazinyl group.

5. The dyestuff of claim 1 wherein D is the residue of an arylmonoazo dyestuff having from one to three sulfo groups, and B is the dehydro radical of an o-unsubstituted hydroxyphenyl group.

6. The dyestuff of claim 1 wherein D is the residue of an arylmonoazo dyestuff having from one to three sulfo groups, and B is the dehydro radical of a p-unsubstituted hydroxphenyl group.

7. The dyestuff of claim 1 wherein D is the residue of a phthalocyanine dyestuff having from one to three sulfo groups and B is the dehydro radical of a carbamoyl group.

8. The dyestuff of claim 1 wherein D is the residue of a phthalocyanine dyestuff having from one to three sulfo groups and B is the dehydro radical of a sulfamoyl group.

9. The dyestuff of claim 1 wherein D is the residue of a phthalocyanine dyestuff having from one to three sulfo groups and B is the dehydro radical of an aminotriazinyl group.

10. The dyestuff of claim 1 wherein D is the residue of a phthalocyanine dyestuff having from one to three sulfo groups and B is the dehydro radical of an o-unsubstituted hydroxyphenyl group.

11. The dyestuff of claim 1 wherein D is the residue of a phthalocyanine dyestuff having from one to three sulfo groups and B is the dehydro radical of a p-unsubstituted hydroxyphenyl group.

12. The dyestuff of claim 1 wherein D is the radical of an anthraquinone dyestuff having from one to three sulfo groups and B is the dehydro radical of a carbamoyl group.

13. The dyestuff of claim 1 wherein D is the radical of an anthraquinone dyestuff having from one to three sulfo groups and B is the dehydro radical of a sulfamoyl group.

14. The dyestuff of claim 1 wherein D is the radical of an anthraquinone dyestuff having from one to three sulfo groups and B is the dehydro radical of an aminotriazinyl group.

15. The dyestuff of claim 1 wherein D is the radical of an anthraquinone dyestuff having from one to three sulfo groups and B is the dehydro radical of an o-unsubstituted hydroxyphenyl group.

16. A dyestuff of the formula $$(HO_3S)_m—D—(SO_2NH_2)_n$$

in which D represents copper phthalocyanine, $m$ and $n$ represent small positive integers and wherein each hydrogen atom attached to a nitrogen atom and capable of reacting with formaldehyde is replaced by the substituent —$CH_2OH$.

17. A 1,3,5-triazine wherein the 2-position is substituted by A, the 4-position is substituted by C; and the 6-position is substituted by a member selected from the group consisting of A and C; A in each occurrence being the monovalent radical of a dyestuff selected from the group consisting of anthraquinone, azo and phthalocyanine dyestuffs, said radical having at least one water solubilizing substituent and being directly bonded to the triazine nucleus through a trivalent nitrogen; and C in each occurrence being a member selected from the group consisting of monomethylolamino and dimethylolamino.

18. A 1,3,5-triazine wherein the 2-position is substituted by A, the 4-position is substituted by C; and the 6-position is substituted by a member selected from the group consisting of A and C; A in each occurrence being the monovalent radical of a dyestuff selected from the group consisting of anthraquinone, azo and phthalocyanine dyestuffs, said radical having at least one water solubilizing substituent and being directly bonded to the triazine nucleus through a trivalent nitrogen; and C in each occurrence being a member selected from the group consisting of O-lower alkylated monomethylolamino and O,O-lower dialkylated dimethylolamino.

19. The compounds of claim 17 in which said triazine ring has two C substituents.

20. The compounds of claim 17 in which the said triazine ring has one C substituent.

21. The compounds of claim 18 in which said triazine ring has two C substituents.

22. The compounds of claim 18 in which said triazine ring has one C substituent.

23. A water-soluble monoazo dyestuff containing a 4,6-diamino-1,3,5-triazine, said triazine being directly bonded in the 2-position to an aromatic nucleus of the azo dyestuff through a trivalent nitrogen atom and wherein each hydrogen atom attached to a nitrogen atom of the triazine and capable of reacting with formaldehyde is replaced by the substituent —$CH_2OH$.

24. The process of applying a fiber-reactive dyestuff of claim 1 to an organic polymeric substrate, said process consisting essentially of contacting the substrate with an aqueous mixture of the dyestuff in the presence of an acidic catalyst at a pH of from 3 to 9, drying the thus treated substrate and subjecting it to a temperature of from about 130° to about 195° C. for from about ½ to about 10 minutes.

25. Polymeric substrates prepared by the process of claim 24.

26. In the process for simultaneous coloration and finishing of cellulose fibers which comprises applying to said fibers an aqueous solution containing as essential ingredients:
(1) a resin forming substance selected from the class of methylol compounds consisting of the formaldehyde condensates of primary and secondary amino compounds;
(2) an acid catalyst; and
(3) a water-soluble reactive dyestuff which is reactive under acid conditions; the improvement which consists in using as said catalyst, an alkanolamine hydrochloride.

References Cited

UNITED STATES PATENTS

| | | | |
|---|---|---|---|
| 3,411,860 | 11/1968 | Braun et al. | 8—18 |
| 1,899,377 | 2/1933 | Zahn et al. | 260—372 |
| 2,368,682 | 2/1945 | Seymour et al. | 260—379 X |
| 2,659,740 | 11/1953 | Dickey et al. | 260—380 |
| 2,685,590 | 8/1954 | Weinand | 260—372 |
| 2,730,534 | 1/1956 | Hoefle et al. | 260—372 X |
| 2,773,071 | 12/1956 | Pizzarello et al. | 260—380 |
| 2,777,863 | 1/1957 | Dickey et al. | 260—380 |
| 2,824,093 | 2/1958 | Benz et al. | 260—146 |
| 2,830,062 | 4/1958 | Lodge | 260—380 |
| 2,968,661 | 1/1961 | Straley et al. | 260—377 |
| 2,876,208 | 3/1959 | Naps | 280—43 |
| 2,933,409 | 4/1960 | Binkley | 117—11 |
| 3,240,764 | 3/1966 | Beamon | 260—79 |
| 3,310,530 | 3/1967 | White | 260—47 |

OTHER REFERENCES

Martell, Chemistry of Metal Chelate Compounds, pp. 510–511, Pub. August 1956 by Prentice Hall, Inc., Englewood Cliffs, N.J., QD 411M38C.7.

GEORGE F. LESMES, Primary Examiner

T. J. HERBERT, JR., Assistant Examiner

U.S. Cl. X.R.

8—54.2; 260—146, 153, 249, 372